United States Patent [19]
Nomura et al.

[11] 4,414,457
[45] Nov. 8, 1983

[54] WIRE-CUT, ELECTRIC DISCHARGE MACHINE

[75] Inventors: Yoshiyuki Nomura; Kanemasa Okuda, both of Hino, Japan

[73] Assignee: Fujitsu Fanuc Ltd., Tokyo, Japan

[21] Appl. No.: 269,594

[22] Filed: Jun. 2, 1981

[30] Foreign Application Priority Data

Jun. 3, 1980 [JP] Japan .................................. 55-77229

[51] Int. Cl.³ ............................. B23P 1/12; B23P 1/08
[52] U.S. Cl. .............................. 219/69 W; 219/69 R; 204/206
[58] Field of Search ................ 219/69 R, 69 M, 69 V, 219/69 W, 68, 74; 204/206

[56] References Cited

U.S. PATENT DOCUMENTS 3,822,374 7/1974 Ullmann et al. ................. 219/69 W
4,263,116 4/1981 Inoue ................................ 219/69 W Primary Examiner—M. H. Paschall
Attorney, Agent, or Firm—Staas & Halsey

[57] ABSTRACT

A wire-cut, electric discharge machine in which a pair of rollers are provided in the vicinity of each of the upper and lower guides of a wire running system for gripping therebetween a wire with constant pressure. When the wire breaks, the pairs of rollers hold the wire to prevent it from coming off the running system.

6 Claims, 5 Drawing Figures

WIRE-CUT, ELECTRIC DISCHARGE MACHINE

BACKGROUND OF THE INVENTION

1. Field of the Invention

The present invention relates to a wire-cut, electric discharge machine which is adapted to eliminate the possibility of a wire leaving the path of the running system when the wire breaks.

2. Description of the Prior Art

A wire-cut, electric discharge machine performs machining of a workpiece into a desired shape by producing a discharge between a wire installed on its running system and the workpiece. The wire may sometimes break during cutting unless the tension of the wire, the feed rate and the cutting conditions are appropriate. Since the wire is given constant tension by a tension brake when the wire breaks is likely to instantly come off its running system. If this phenomenon extends to the vicinity of the wire supply reel, reinstallation of the wire on the running system is very troublesome and impairs machining efficiency.

FIGS. 1A and 1B schematically show the breakage of the wire in a conventional wire-cut, electric discharge machine. In FIGS. 1A and 1B, reference numeral 1 indicates a wire; 2 designates a wire take-up reel; 3 identifies wire feed rollers; 4 and 8 denote feed pins; 5 represents an upper guide; 6 shows a workpiece; 7 refers to a lower guide; 9 indicates a guide roller; 10 designates a tension brake; and 11 identifies a wire supply reel.

During cutting the wire 1 is installed on the running system, as shown in FIG. 1A, and subjected to fixed tension by the tension brake 10, as mentioned previously. Accordingly, when the wire 1 breaks, it comes off the running system, as depicted in FIG. 1B, and reinstallation of the wire 1 on the running system is very time-consuming, as described previously.

To avoid such a defect, the general practice in the prior art is to provide felt pads (not shown) for gripping therebetween the wire 1 in the neighborhood of each of the upper and lower guides 5 and 7 in order to stretch the wire 1 perpendicularly to the reference plane of the workpiece 6 to prevent the wire 1 from getting out of the running system when it is breaks. With the conventional method, however, it is difficult to adjust the pressure of the pads so that the tension of the travelling wire 1 is uniform over the entire range of the running system; lack of uniform tension also leads to the drawback that the wire 1 is more apt to break.

SUMMARY OF THE INVENTION

It is an object of the present invention to provide a wire-cut, electric discharge machine designed to prevent the wire from getting out of the running system when the wire is breaks.

Another object of the present invention is to provide a wire-cut, electric discharge machine adapted to facilitate reinstallation of a broken wire.

Yet another object of the present invention is to provide a wire-cut, electric discharge machine providing uniform tension over the entire range of the wire running system.

Briefly stated, in the wire-cut, electric discharge machine of the present invention, a pair of rollers are provided in the vicinity of each of the upper and lower guides of the wire running system for gripping therebetween the wire with a constant pressure.

DESCRIPTION OF THE PREFERRED EMBODIMENTS

Figure 1A:
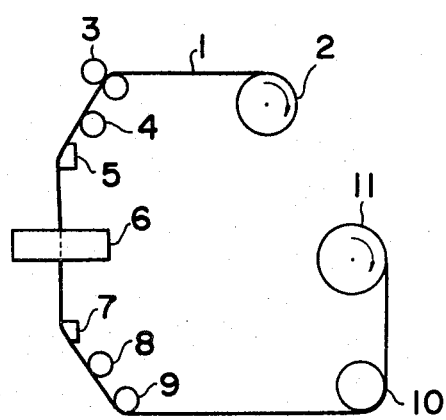
FIGS. 1A and 1B show of a prior art example.
Figure 1B:
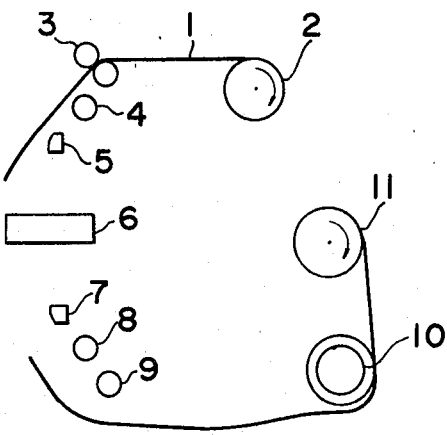
Figure 2A:
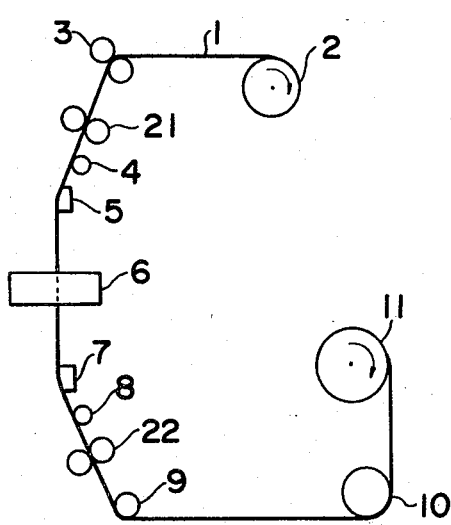
FIGS. 2A and 2B show of an embodiment of the present invention.
Figure 2B:
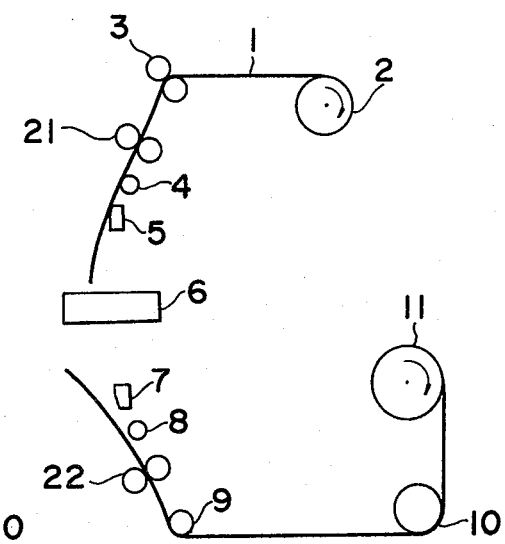

FIGS. 2A and 2B schematically illustrate an embodiment of the present invention, which differing from the prior art example of FIGS. 1A and 1B in that the wire 1 is gripped between each of roller pairs 21 and 22, which are pressed by springs or the like. In FIGS. 2A and 2B, the parts corresponding to those in FIGS. 1A and 1B are identified by the same reference numerals.

Figure 3:
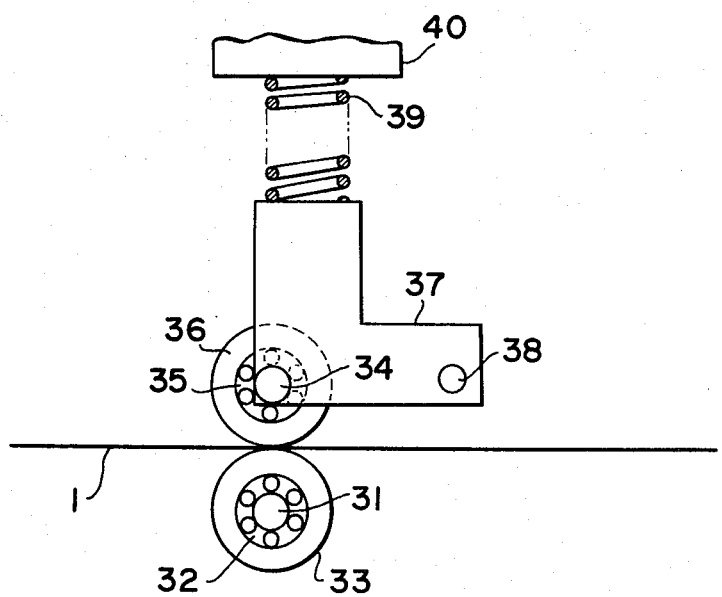
FIG. 3 schematically illustrates the construction of a roller pair for use in the present invention.

The roller pair 21 is constructed, for example as, shown in FIG. 3, and includes a fixed roller (composed of a shaft 31, a ball bearing 32 and a roller member 33), and a pressure roller (composed of a shaft 34, a ball bearing 35 and a roller member 36), a movable member 37 is movable about a shaft 38 but having its shaft 34 fixed. Spring 39 is fixed at one end to a stationary part 40 and presses the movable member 37. The wire 1 is gripped between the both roller members as illustrated. Roller pair 22 is constructed the same as roller pair 21.

Accordingly, even if the wire 1 breaks, it is retained by the roller pairs 21 and 22, preventing the wire leaving the running system in the neighborhood of the wire supply reel 11. Furthermore, since the wire 1 is gripped by the roller pairs 21 and 22, each pair being pressed together by spring force, the tension of the travelling wire 1 can be kept uniform over the entire range of the wire running system.

As has been described above, according to the present invention, roller pairs are provided for gripping in the wire travelling system at a constant pressure, so that it is possible to prevent the wire from coming off the travelling system when it breaks and to make the tension of the wire over the entire range of the running system. Accordingly, the present invention exhibits the advantages that reinstallation of the wire is facilitated and that the wire is less likely to break than in the prior art employing the felt pads.

It will be apparent that many modifications and variations may be effected without departing from the scope of the novel concepts of this invention.

What is claimed is:

1. A wire-cut electric discharge machine for machining of a workpiece into a desired shape by producing a discharge between the workpiece and a wire installed on its running system, including in sequence a supply reel, a first fixed running system guide, the workpiece, and a take-up means for taking up the wire, said take-up means including a driven roller pair and a second fixed running system guide disposed between the workpiece and the driven roller pair, comprising: undriven roller pair means for gripping the wire with constant pressure and for preventing the wire installed in the running system from coming out of the running system, said undriven roller pair means being provided between the first fixed running guide and the supply reel, the undriven roller pair means including a fixed roller, a pressure roller and a spring, said pressure roller being urged against the fixed roller by means of the spring.

2. An improved wire-cut, electric discharge machine having a running system for moving a wire electrode therealong in order to machine a workpiece by producing a discharge between the workpiece and the wire electrode, the wirecut, electric discharge machine including in sequence a supply reel, a first fixed running system guide, the workpiece, and a take-up means for taking up the wire, said take-up means including a driven roller pair and a second fixed running system guide disposed between the workpiece and the driven roller pair, wherein the improvement comprises; an undriven roller pair to grip the wire electrode at constant pressure and to prevent the wire installed in the running system from coming out of the running system, wherein the undriven roller pair is positioned between the first fixed running system guide and the supply reel, the undriven roller pair including a fixed roller, a pressure roller and a spring, said pressure roller being urged against the fixed roller by the spring, the fixed roller comprising a shaft fixedly mounted to the electric discharge machine, a ball bearing assembly mounted for rotation about the shaft, and a roller member mounted around the ball bearing assembly, and the pressure roller comprising a member movable relative to the electric discharge machine, a first shaft fixedly mounted on the movable member, a ball bearing assembly mounted for rotation about the shaft and a roller member mounted around the ball bearing assembly, the movable member being movable about a second shaft, with one end of said spring connected to the movable member and the other end of said spring connected to a stationary member.

3. An improved electric discharge machine for machining an opening in a workpiece by producing an electric discharge between the workpiece and an elongated electrode moving through the opening along an electrode path extending from an electrode supplying reel to a driven roller pair and thence to an electrode disposal apparatus, wherein the improvement comprises:
   first freely rotatable retention means mounted between the workpiece and the supply reel for retaining the electrode on that portion of the electrode path between the first retention means and the supply reel should the electrode break during machining, the first retention means including a first undriven roller pair; and
   second freely rotatable retention means mounted between the workpiece and the driven roller pair for retaining the electrode on that portion of the electrode path between the workpiece and the driven roller pair should the electrode break during machining, the second retention means including a second undriven roller pair;
   wherein each undriven roller pair includes a fixed roller, a pressure roller and a spring, said pressure roller being urged against the fixed roller by the spring.

4. The electric discharge machine defined in claim 3, wherein the fixed roller comprises: a shaft fixedly mounted to the electric discharge machine; a ball bearing assembly mounted for rotation about the shaft; and a roller member mounted around the ball bearing assembly.

5. The electric discharge machine defined in claim 3, wherein the pressure roller comprises: a member movable relative to the electric discharge machine, a first shaft fixedly mounted on the movable member; a ball bearing assembly mounted for rotation about the shaft; and a roller member mounted around the ball bearing assembly; said movable member being movable about a second shaft, with one end of said spring connected to the movable member and the other end of said spring connected to a stationary member.

6. The electric discharge machine defined in claim 3 wherein the elongated electrode is a wire electrode.

* * * * *

UNITED STATES PATENT AND TRADEMARK OFFICE
CERTIFICATE OF CORRECTION

PATENT NO. : 4,414,457
DATED : 11/8/83
INVENTOR(S) : YOSHIYUKI NOMURA ET AL.

It is certified that error appears in the above-identified patent and that said Letters Patent is hereby corrected as shown below:

Front Page
(73), Assignee, "Ltd." should be --Ltd--;

Column 2

Line 3, delete "of";
Line 4, delete "of";
Line 12, delete ", which";
Line 18, "as," should be --, as--;
Line 22, "36), a movable" should be --36). A movable--;
Line 29, after "wire" insert --from--;
Line 37, after "gripping" insert --the wire--.

Column 3

Line 10, after "comprises" change ";" to --:--.

Signed and Sealed this

Twenty-seventh Day of November 1984

[SEAL]

Attest:

GERALD J. MOSSINGHOFF

Attesting Officer

Commissioner of Patents and Trademarks